(12) United States Patent
Dolman

(10) Patent No.: US 9,806,757 B1
(45) Date of Patent: Oct. 31, 2017

(54) MOBILE COMPUTING DEVICE HOLDER

(71) Applicant: April Dolman, Snellville, GA (US)

(72) Inventor: April Dolman, Snellville, GA (US)

( * ) Notice: Subject to any disclaimer, the term of this patent is extended or adjusted under 35 U.S.C. 154(b) by 0 days.

(21) Appl. No.: 15/436,701

(22) Filed: Feb. 17, 2017

(51) Int. Cl.
  *H04M 1/00* (2006.01)
  *H04B 1/3888* (2015.01)
  *H04M 1/02* (2006.01)
  *A63H 3/02* (2006.01)
  *A63H 3/00* (2006.01)

(52) U.S. Cl.
  CPC ........... *H04B 1/3888* (2013.01); *A63H 3/005* (2013.01); *A63H 3/02* (2013.01); *H04M 1/0202* (2013.01)

(58) Field of Classification Search
  None
  See application file for complete search history.

(56) References Cited

FOREIGN PATENT DOCUMENTS

CN   202918368 U  *  5/2013
DE       29812203 U1  * 10/1998  ............... B60R 7/00

* cited by examiner

*Primary Examiner* — Mohammed Rachedine
(74) *Attorney, Agent, or Firm* — Gulf Coast Intellectual Property Group

(57) ABSTRACT

A mobile computing device holder that is operable to receive and releasably secure a mobile computing device such as but not limited to a tablet PC. The mobile computing device holder includes a body having an interior volume wherein the body is formed in the shape of an animal. Disposed within the interior volume of the body is a mobile computing device receiver that is configured to releasably secure a mobile computing device. The mobile computing device receiver includes a annular central portion and a first arm and second arm secured thereto and diametrically opposite the central portion. A base member is disposed within the interior volume of the body and functions to anchor the mobile computing device receiver wherein the base member and the mobile computing device receiver has an arm intermediate thereto. A controller is present to electrically couple to mobile computing device.

20 Claims, 4 Drawing Sheets

MOBILE COMPUTING DEVICE HOLDER

FIELD OF THE INVENTION

The present invention relates generally to mobile computing device accessory apparatus, more specifically but not by way of limitation a mobile computing device holder configured to receive and retain a mobile computing device such as but not limited to a tablet PC, wherein the mobile computing device is configurable to retain alternate size computing devices and wherein the body thereof is formed in the shape of an animal.

BACKGROUND

Utilization of mobile computing devices have proliferated in society over the last decade. The functionality that was once only possible utilizing a laptop computer is now being performed by smaller devices such as but not limited to tablet PC's and smartphones. The aforementioned devices are now present in the United States having an installation base of hundreds of millions with more being added every year. The graphical user interface and the ease of use provides a superior and logical interface for the user experience.

Today, more people access websites and execute other similar tasks utilizing mobile computing devices. These devices are further utilized by students and young children as an educational tool. Thousands of software programs have been provided for these mobile devices that range in abilities and functionality. Many early learning programs leverage mobile computing devices and various software programs to teach skills such as but not limited to math and language. Additionally, these devices are utilized by parents to provide entertainment for children.

One issue with existing mobile computing device holders is their inability to receive and retain mobile computing devices of alternate sizes. Conventional holders are typically cases that are manufactured for a specific brand and size of mobile computing device. These cases further lack any novelty in their design so as to create an appeal for a younger child demographic. Conventional cases for mobile computing devices lack a body that promotes engagement therewith or provides any additional type of novelty effect.

Accordingly, there is a need for a mobile computing device holder that is configured to releasably secure therein alternate sizes of mobile computing devices and further include a body that is formed in the shape of an animal.

SUMMARY OF THE INVENTION

It is the object of the present invention to provide a mobile computing device holder that is configured to releasably retain mobile computing devices of alternate sizes wherein the body is formed in the shape of a stuffed animal.

Another object of the present invention is to provide a mobile computing device holder operable to receive and secure a plurality of mobile computing devices wherein the mobile computing device holder includes a mount having opposing telescoping arms.

A further object of the present invention is to provide a mobile computing device holder that is configured to releasably retain mobile computing devices of alternate sizes wherein the mount is rotatably secured to an arm member so as to provide rotational movement of the mobile computing device.

An additional object of the present invention is to provide a mobile computing device holder operable to receive and secure a plurality of mobile computing devices wherein the mobile computing device holder further includes a base member disposed within the body that is operably coupled to the arm member.

Still another object of the present invention is to provide a mobile computing device holder that is configured to releasably retain mobile computing devices of alternate sizes wherein the body further includes arm and leg members and wherein at least one audio speaker is disposed therein proximate the end thereof.

Yet a further object of the present invention is to provide a mobile computing device holder operable to receive and secure a plurality of mobile computing devices wherein the arm and leg members of the body further have at least one control knob secured thereto.

An alternative object of the present invention is to provide a mobile computing device holder that is configured to releasably retain mobile computing devices of alternate sizes that further includes a processor having the necessary electronics to operate the mobile computing device.

Another object of the present invention is to provide a mobile computing device holder operable to receive and secure a plurality of mobile computing devices that further includes a power supply and auxiliary cable connections operable to provide power and accessory coupling for a mobile computing device.

An additional object of the present invention is to provide a mobile computing device holder that further includes the necessary electronics to facilitate a Bluetooth operable connection intermediate the mobile computing device holder and a mobile computing device.

Still an additional object of the present invention is to provide a mobile computing device holder that is configured to releasably retain mobile computing devices of alternate sizes that further includes at least one zippered access port.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
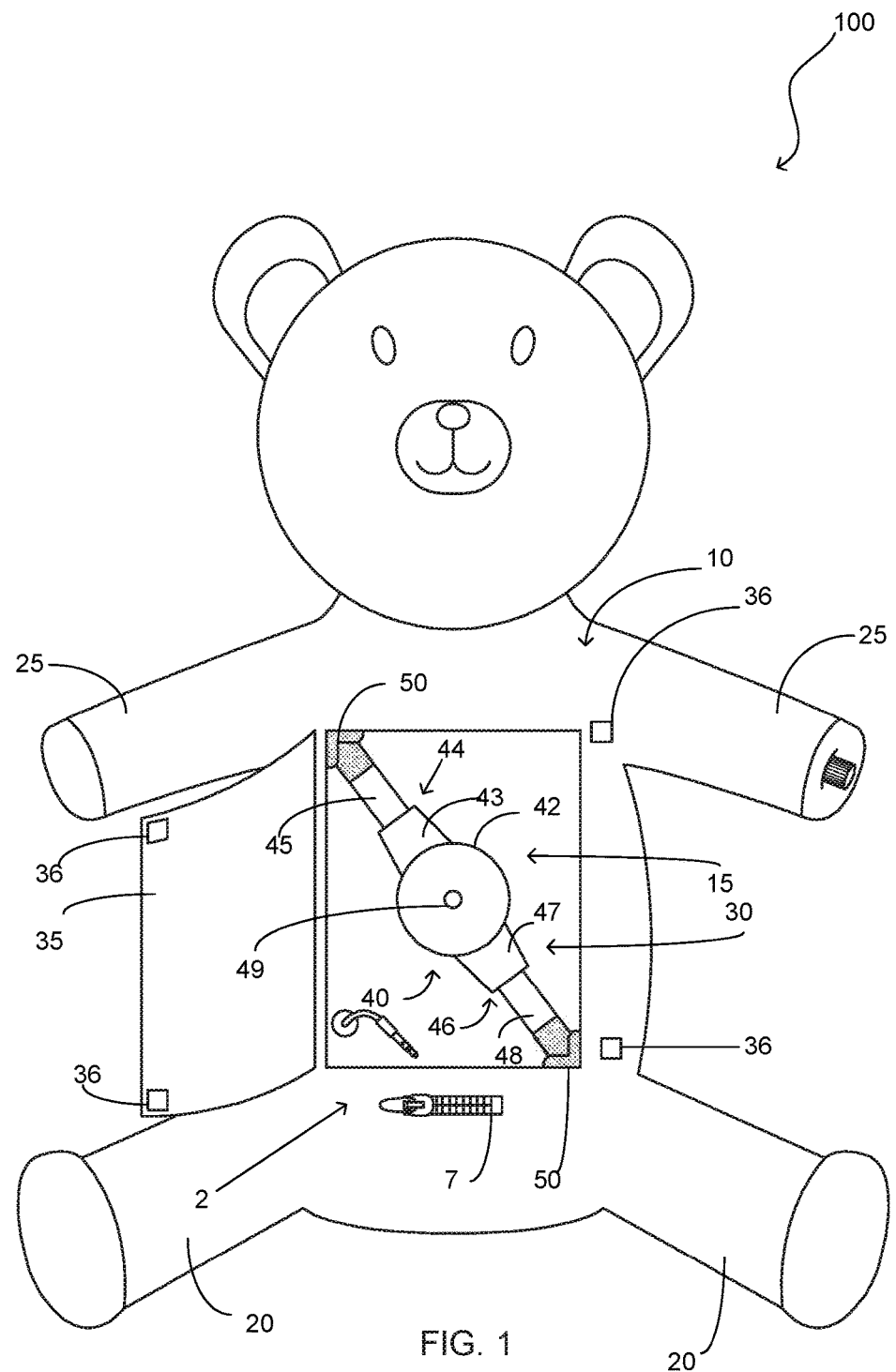
FIG. 1 is a front view of the present invention.
Figure 2:
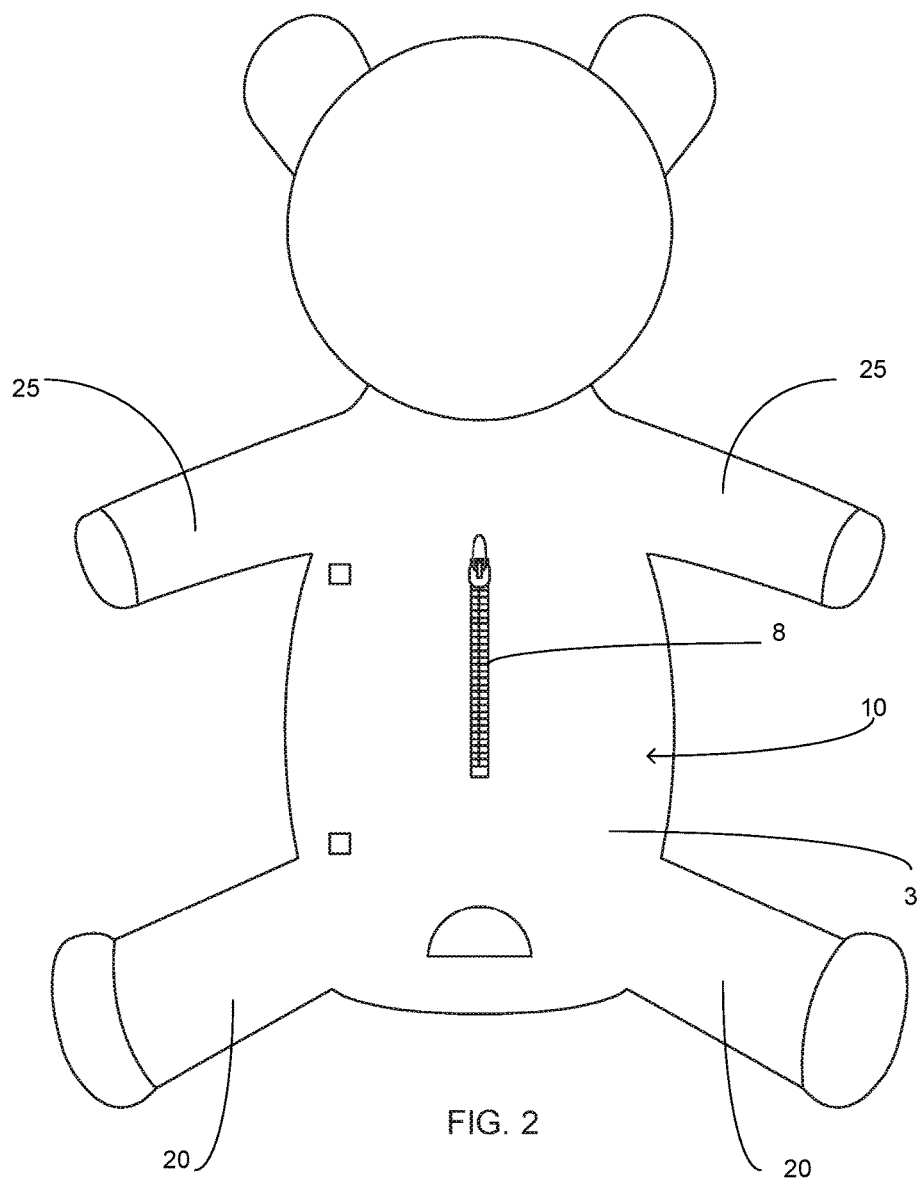
FIG. 2 is a rear view of the present invention.

Referring now to the drawings submitted herewith, wherein various elements depicted therein are not necessarily drawn to scale and wherein through the views and figures like elements are referenced with identical reference numerals, there is illustrated a tablet PC holder 100 constructed according to the principles of the present invention.

An embodiment of the present invention is discussed herein with reference to the figures submitted herewith.

Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Referring now in particular to FIG. 1 herein, the tablet PC holder 100 further includes a body 10. The body 10 is manufactured from suitable durable materials and includes an interior volume 15 operable to house a mobile computing device. The body 10 in the preferred embodiment of the present invention includes leg members 20 and arm members 25 and wherein the body 10 is formed in the shape of an animal. In its preferred embodiment the body 10 is formed in the shape of a bear, it is contemplated within the scope of the present invention that the body 10 could be formed in the shape of numerous different animals. The shape of the body 10 is designed so as to provide initial visual engagement with a younger user of a mobile computing device disposed within the interior volume 15 of the body 10. The body includes an opening 30 that is configured to provide access to the interior volume 15. The opening 30 of the body 10 is covered by flap member 35. Flap member 35 is planar in manner and manufactured from a flexible material and is operable to move intermediate a first position and a second position. The flap member 35 in its second position is configured to cover the exemplary mobile computing device 99 when not in use. In its first position, as illustrated herein, the flap member 35 is hingedly moved away from the opening 30 so as to provide access to the exemplary mobile computing device 99. The flap member 35 further includes integrally secured fasteners 36 operable to maintain the flap member 35 in its second position. The fasteners 36 are secured utilizing suitable durable techniques such as but not limited to stitching or chemical adhesion. The fasteners 36 in their preferred embodiment are hook and loop fastener but it is contemplated within the scope of the present invention that the fasteners 36 could be constructed in alternate forms such as but not limited to snaps or buttons.

Disposed within the interior volume 15 of the body 10 is the mobile computing device receiver 40. The mobile computing device receiver 40 is operable to receive and releasably secure an exemplary mobile computing device 99. The mobile computing device receiver 40 includes a central portion 42 having a first arm member 44 and a second arm member 46 extending outward therefrom wherein the first arm member 44 and the second arm member 46 are diametrically opposite on the central portion 42. The mobile computing device receiver 40 is manufactured from a suitable durable material such as but not limited to plastic or metal. The central portion 42 is rotatably mounted to arm 60 via keeper 49 wherein keeper 49 facilitates the rotatable movement of the exemplary mobile computing device 99 ensuing being secured into the mobile computing device receiver 40. The first arm member 44 includes first section 43 and second section 45 wherein the second section 45 is telescopically coupled to the first section 43 so as to allow accommodation for alternate sizes of exemplary mobile computing devices 99. The second arm member 46 includes first section 47 and second section 48 that are constructed similarly first arm member 44 wherein the second section 48 is telescopically secured to first section 47.

Integrally formed with second sections 45, 48 are retaining members 50. The retaining members 50 include a first portion 51 and second portion 52 that are integrally formed wherein the first portion 51 and second portion 52 are formed at a right angle, i.e. approximately ninety degrees. The retaining members 50 are operable to frictionally engage the corner 98 of the exemplary mobile computing device 99 so as to secure the exemplary mobile computing device 99 within the body of the tablet PC holder 100. As previously mentioned herein, the first arm member 44 and second arm member 46 are telescopic so as to promote the ability for the mobile computing device receiver 40 to secure therein alternate sizes of exemplary mobile computing devices 99. While the mobile computing device receiver 40 is illustrated herein having a particular embodiment, it is contemplated within the scope of the present invention that the mobile computing device receiver 40 could be formed in alternate shapes and utilize alternate elements in order to achieve the desired functionality as described herein.

Figure 3:
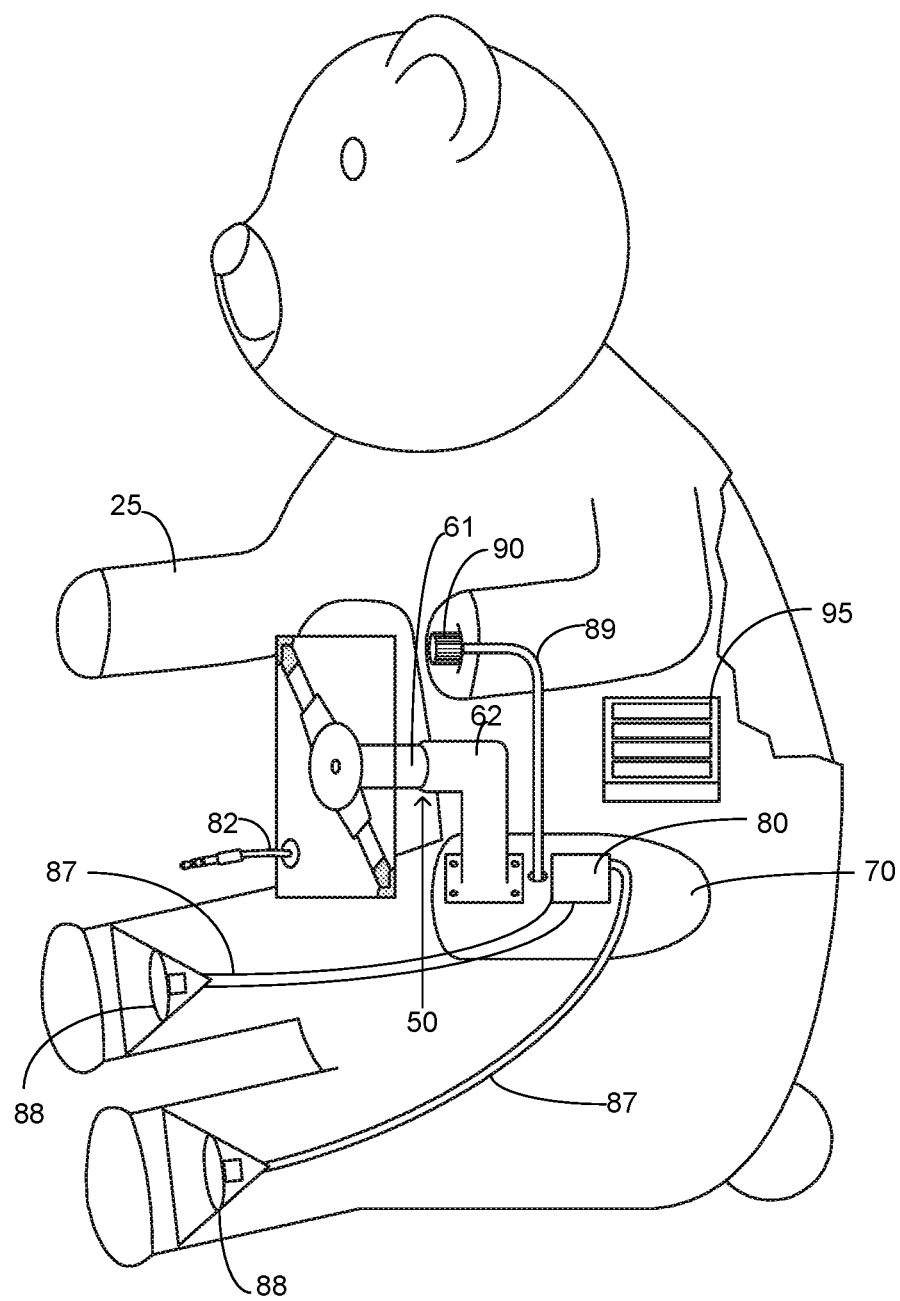
FIG. 3 is a side cross-sectional view of the present invention.
Figure 4:
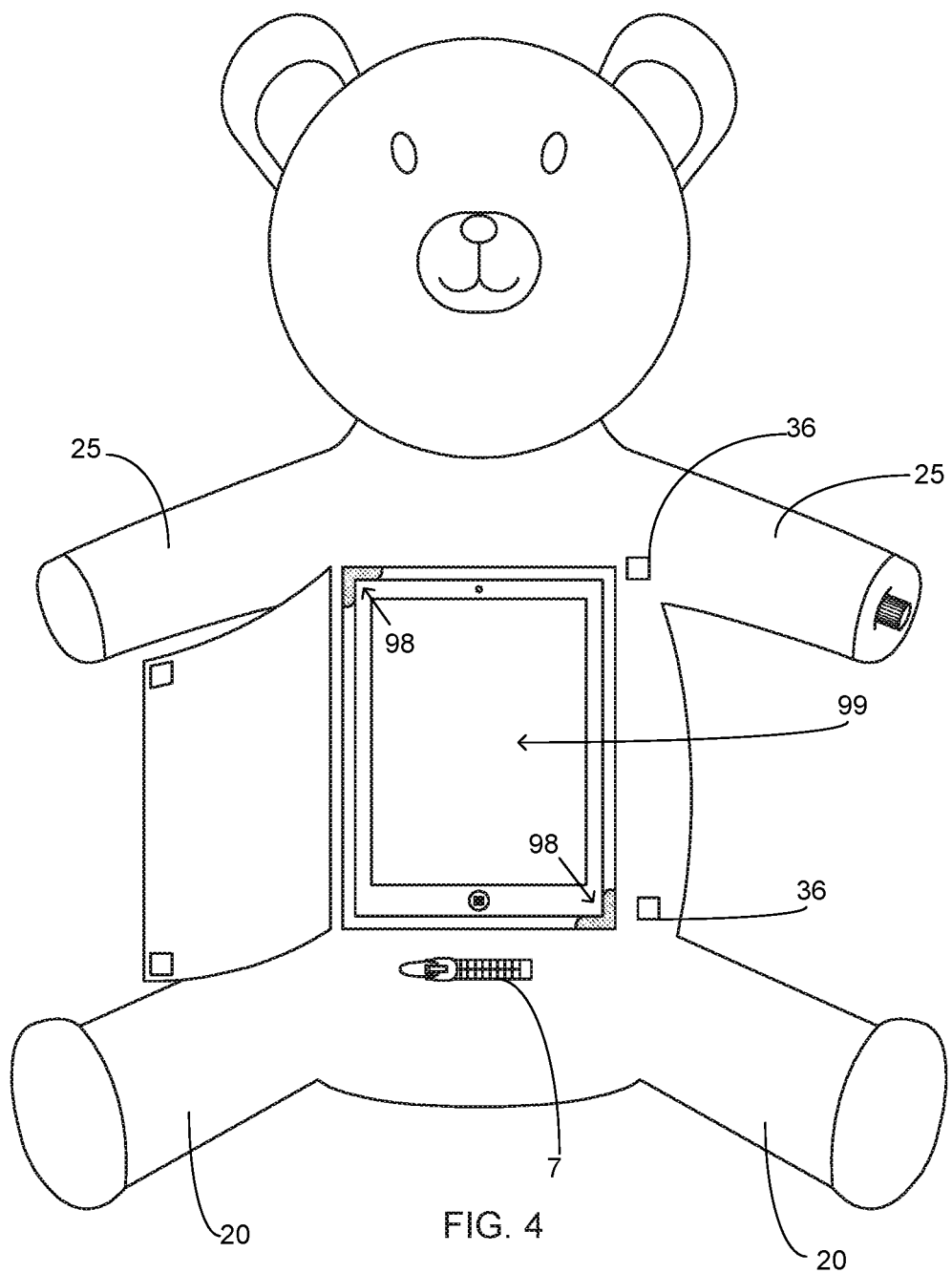
FIG. 4 is a front view of the present invention with an exemplary mobile computing device disposed therein.

The mobile computing device receiver 40 is coupled to arm 60 utilizing fastener 49. Arm 60 includes first section 61 and second section 62 wherein first section 61 is telescopically mounted to second section 62. The aforementioned configuration of the arm 60 allows a user of the tablet PC holder 100 to manipulate the position of the exemplary mobile computing device 99 in relation to its position within the interior volume 15 of the body 10 such that the exemplary mobile computing device 99 is moved in an inward-outward direction with respect to the interior volume 15. The second section 62 is formed in a right angle and is secured to base member 70. The right angle formation of the second section 62 and its attachment to the base member 70 distal to the first section 61 provides the necessary balance in order to maintain the position of the tablet PC holder 100 ensuring the securement of an exemplary mobile computing device 100 therein in an generally upright position as illustrated herein in FIG. 3. The base member 70 is manufactured from a dense heavy material such as but not limited to metal and is operable to provide a weight balance so as to maintain the body 10 in an upright position. It is contemplated within the scope of the present invention that the base member 70 could be constructed in alternate sizes, shapes and weight so as to achieve the desired functionality as described herein.

Controller 80 is secured to base member 70 utilizing suitable durable techniques and includes the necessary electronics to store, receive, transmit and manipulate data signals. It should be understood within the scope of the present invention that the controller 80 further includes the necessary electronics to facilitate a Bluetooth connection intermediate a mobile computing device 99 and the tablet PC holder 100. The controller 80 is electrically coupled to the exemplary mobile computing device 99 via cable 82. Electronics disposed within controller 80 are configured to provide audio signal reception, transmission and control. More specifically, the controller 80 receives audio signals from the exemplary mobile computing device 99 and transmits the audio signals for broadcast via speakers 88. Transmission of the audio signals from the controller 80 to the speakers 88 occurs via wire 87 wherein the controller 80 receives an audio signal via wire 82. Controller 80 is further operably coupled to audio control 90 via wire 89 wherein the audio control 90 is secured in arm member 25 and is operable to control the volume output of the audio signal transmitted to the speakers 80. Power supply 95 is disposed within the interior volume 15 of the body 10 and is electrically coupled to the exemplary mobile computing device 99. The power supply 95 is configured to provide recharging of an integrated power supply within the exemplary mobile computing device 100. It is contemplated within the scope of the present invention that the power supply 95 could include but not be limited to alkaline or lithium ion batteries.

Body 10 includes a first access port 7 and a second access port 8 integrally formed therewith. First access port 7 is formed on the front side 2 of the body 10 and the second access port 8 is formed on the rear side 3 of the body 10. The first access port 7 and second access port 8 are operable to provide access to the interior volume 15 of the body 10 as necessary for manipulation and/or maintenance of elements disposed therein such as but not limited to the power supply 95. The first access port 7 and second access port 8 are illustrated herein utilizing zippers to provide opening and closing thereof but it is contemplated within the scope of the present invention that the first access port 7 and second access port 8 could utilize alternate configuration to provide the opening and closing thereof.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A mobile computing device holder comprising:
   a body, said body being formed in the shape of an animal, said body having an interior volume, said body further having an opening, said opening providing access to said interior volume;
   a mobile computing device receiver, said mobile computing device receiver being disposed within said interior volume of said body, said mobile computing device receiver having a central portion, said central portion being annular in shape, said mobile computing device receiver having a first arm and a second arm, said first arm and said second arm being secured to said central portion, said first arm and said second arm being diametrically opposed;
   a base member, said base member being disposed within said interior volume of said body,
   an arm, said arm being disposed within said interior volume of said body, said arm configured to couple said base member with said mobile computing device holder.

2. The mobile computing device holder as recited in claim 1, and further including a controller, said controller having the necessary electronics to store, receive, manipulate and transmit audio data signals.

3. The mobile computing device holder as recited in claim 2, wherein said first arm of said mobile computing device member further includes a retaining member, said retaining member being integrally formed with said first arm distal to said central portion.

4. The mobile computing device holder as recited in claim 3, wherein said second arm of said mobile computing device member further includes a retaining member, said retaining member being integrally formed with said second arm distal to said central portion.

5. The mobile computing device holder as recited in claim 4, wherein said arm includes a first section and a second section, said second section of said arm being formed in a right angle, said second section being secured to said base member.

6. The mobile computing device holder as recited in claim 5, and further including at least one speaker, said at least one speaker being disposed within said body, said at least one speaker being electrically coupled to a mobile computing device secured within said mobile computing device holder.

7. The mobile computing device holder as recited in claim 6, and further including a power supply, said power supply being disposed within said interior volume of said body, said body supply being electrically coupled a mobile computing device secured within said mobile computing device holder.

8. A mobile computing device holder that is configured to receive and retain a mobile computing device wherein the mobile computing device holder is formed so as to be visually appealing to children comprising:
   a body, said body being formed in the shape of an animal, said body having arm members, said body having leg members, said body having an interior volume, said body further having an opening, said opening providing access to said interior volume proximate the central portion of said body;
   a mobile computing device receiver, said mobile computing device receiver being disposed within said interior volume of said body, said mobile computing device receiver having a central portion, said central portion being annular in shape, said central portion being rotatable, said mobile computing device receiver having a first arm and a second arm, said first arm and said second arm being secured to said central portion, said first arm and said second arm being diametrically opposed, said first arm and said second arm being telescopic;

a base member, said base member being disposed within said interior volume of said body;

an arm, said arm being disposed within said interior volume of said body, said arm having a first section and a second section, said second section being secured to said base member, said first section being intermediate said second section and said central portion, said arm configured to couple said base member with said mobile computing device holder; and retaining members, said retaining members being integrally formed with said first arm and said second arm of said mobile computing device receiver, said retaining members being distal to said central portion.

9. The mobile computing device holder as recited in claim 8, and further including a flap member, said flap member being secured to said body, said flap member operable to cover said opening of said body.

10. The mobile computing device holder as recited in claim 9, and further including a controller, said controller having the necessary electronics to store, receive, manipulate and transmit audio data signals.

11. The mobile computing device holder as recited in claim 10, wherein said first arm of said mobile computing device receiver further includes a first section and a second section, said first section being telescopically mounted to said second section.

12. The mobile computing device holder as recited in claim 11, wherein said second arm of said mobile computing device receiver further includes a first section and a second section, said first section of said second arm being telescopically mounted to said second section of said second arm.

13. The mobile computing device holder as recited in claim 12, wherein said retaining members further include a first portion and a second portion, said first portion and said second portion being integrally formed, said first portion and said second portion being formed at a right angle so as to frictionally engage a corner of a mobile computing device.

14. The mobile computing device holder as recited in claim 13, wherein said body further includes at least one access port, said at least one access port configured to provide access to the interior volume of said body.

15. A mobile computing device holder that is configured to receive and retain a mobile computing device wherein the mobile computing device holder is formed so as to be visually appealing to children comprising:

a body, said body being formed in the shape of an animal, said body having arm members, said body having leg members, said body having an interior volume, said body further having an opening, said opening providing access to said interior volume proximate the central portion of said body;

a mobile computing device receiver, said mobile computing device receiver being disposed within said interior volume of said body, said mobile computing device receiver having a central portion, said central portion being annular in shape, said central portion being rotatable, said mobile computing device receiver having a first arm and a second arm, said first arm and said second arm being secured to said central portion, said first arm and said second arm being diametrically opposed, said first arm of said mobile computing device receiver further includes a first section and a second section, said first section being telescopically mounted to said second section, said second arm of said mobile computing device receiver further includes a first section and a second section, said first section of said second arm being telescopically mounted to said second section of said second arm;

a base member, said base member being disposed within said interior volume of said body;

an arm, said arm being disposed within said interior volume of said body, said arm having a first section and a second section, said second section being secured to said base member, said first section being intermediate said second section and said central portion, said first section being telescopically movable relative to said second section, said arm configured to couple said base member with said mobile computing device holder;

retaining members, said retaining members being integrally formed with said first arm and said second arm of said mobile computing device receiver, said retaining members being distal to said central portion; and a controller, said controller having the necessary electronics to store, receive, manipulate and transmit audio data signals, said controller configured to be electrically coupled to a mobile computing device.

16. The mobile computing device holder as recited in claim 15, wherein said retaining members further include a first portion and a second portion, said first portion and said second portion being integrally formed, said first portion and said second portion being formed at a right angle so as to frictionally engage a corner of a mobile computing device.

17. The mobile computing device holder as recited in claim 16, an further including at least one speaker, said at least one speaker being disposed within said body, said at least one speaker being electrically coupled to said controller.

18. The mobile computing device holder as recited in claim 17, and further including a flap member, said flap member being secured to said body, said flap member operable to cover said opening of said body.

19. The mobile computing device holder as recited in claim 18, and further including a power supply, said power supply being disposed within said interior volume of said body, said body supply being electrically coupled a mobile computing device secured within said mobile computing device holder.

20. The mobile computing device holder as recited in claim 19, wherein said body further includes at least one access port, said at least one access port configured to provide access to the interior volume of said body.

* * * * *